US010245811B2

(12) United States Patent
Kitajima et al.

(10) Patent No.: US 10,245,811 B2
(45) Date of Patent: Apr. 2, 2019

(54) SURFACE-PROTECTING FILM

(71) Applicant: KURARAY CO., LTD., Kurashiki-shi (JP)

(72) Inventors: Tomoyuki Kitajima, Sodegaura (JP); Keito Hishinuma, Sodegaura (JP)

(73) Assignee: KURARAY CO., LTD., Kurashiki-shi (JP)

( * ) Notice: Subject to any disclaimer, the term of this patent is extended or adjusted under 35 U.S.C. 154(b) by 163 days.

(21) Appl. No.: 15/037,815

(22) PCT Filed: Nov. 20, 2014

(86) PCT No.: PCT/JP2014/080762
§ 371 (c)(1),
(2) Date: Jun. 30, 2016

(87) PCT Pub. No.: WO2015/076332
PCT Pub. Date: May 28, 2015

(65) Prior Publication Data
US 2016/0297187 A1 Oct. 13, 2016

(30) Foreign Application Priority Data

Nov. 21, 2013 (JP) ................................. 2013-240842

(51) Int. Cl.
| | | |
|---|---|---|
| B32B 27/32 | (2006.01) | |
| B32B 27/08 | (2006.01) | |
| B32B 7/12 | (2006.01) | |
| C09J 7/00 | (2018.01) | |
| C09J 153/02 | (2006.01) | |
| B32B 27/30 | (2006.01) | |
| B32B 7/06 | (2019.01) | |
| B32B 27/20 | (2006.01) | |
| C08L 33/06 | (2006.01) | |
| C09J 7/38 | (2018.01) | |
| C09J 7/22 | (2018.01) | |
| C09J 7/24 | (2018.01) | |
| C09J 133/00 | (2006.01) | |

(52) U.S. Cl.
CPC ................ *B32B 27/32* (2013.01); *B32B 7/06* (2013.01); *B32B 7/12* (2013.01); *B32B 27/08* (2013.01); *B32B 27/20* (2013.01); *B32B 27/302* (2013.01); *B32B 27/308* (2013.01); *C08L 33/06* (2013.01); *C09J 7/22* (2018.01); *C09J 7/241* (2018.01); *C09J 7/38* (2018.01); *C09J 153/02* (2013.01); *B32B 2250/24* (2013.01); *B32B 2270/00* (2013.01); *B32B 2307/412* (2013.01); *B32B 2307/748* (2013.01); *B32B 2405/00* (2013.01); *B32B 2571/00* (2013.01); *C09J 133/00* (2013.01); *C09J 2201/606* (2013.01); *C09J 2205/114* (2013.01); *C09J 2423/006* (2013.01); *C09J 2425/00* (2013.01); *C09J 2433/00* (2013.01); *C09J 2453/00* (2013.01)

(58) Field of Classification Search
CPC . B32B 27/32; B32B 7/12; B32B 27/08; C09J 7/0271; C09J 7/0246; C09J 133/00
See application file for complete search history.

(56) References Cited

U.S. PATENT DOCUMENTS

| | | | |
|---|---|---|---|
| 5,286,781 | A | 2/1994 | Gotoh et al. |
| 5,427,850 | A | 6/1995 | Gotoh et al. |
| 5,747,132 | A | 5/1998 | Matsui et al. |
| 5,882,775 | A | 3/1999 | Matsui et al. |
| RE40,723 | E | 6/2009 | Matsui et al. |
| 2010/0080990 | A1 | 4/2010 | Shirai et al. |
| 2011/0236676 | A1 | 9/2011 | Kimura et al. |
| 2013/0177761 | A1 | 7/2013 | Kimura et al. |
| 2013/0302602 | A1 | 11/2013 | Takeda et al. |

FOREIGN PATENT DOCUMENTS

| | | | |
|---|---|---|---|
| JP | 61-103975 | A | 5/1986 |
| JP | 6-73352 | A | 3/1994 |
| JP | 2713519 | B2 | 2/1998 |
| JP | 2000-80336 | A | 3/2000 |
| JP | 2000-351952 | A * | 12/2000 |
| JP | 2008-255185 | A | 10/2008 |
| JP | 2009-185138 | | 8/2009 |
| JP | 2010-018796 | | 1/2010 |
| JP | 2010-126711 | A | 6/2010 |

(Continued)

OTHER PUBLICATIONS

International Search Report dated Feb. 17, 2015 in PCT/JP2014/080762 (with English language translation).

(Continued)

*Primary Examiner* — Robert D. Harlan

(74) *Attorney, Agent, or Firm* — Oblon, McClelland, Maier & Neustadt, L.L.P.

(57) ABSTRACT

The surface protective film of the present invention is characterized in that the film comprises a polyolefin-based substrate layer and a pressure-sensitive adhesive layer, the pressure-sensitive adhesive layer contains at least a styrene-based elastomer, an acrylic-based pressure-sensitive adhesive and a tackifier, and in the pressure-sensitive adhesive layer, the styrene-based elastomer is blended in an amount of not less than 50% by mass but not more than 90% by mass based on the total amount of the pressure-sensitive adhesive layer, the acrylic-based pressure-sensitive adhesive is blended in an amount of not less than 1% by mass but not more than 40% by mass based on the total amount of the pressure-sensitive adhesive layer, and the tackifier is blended in an amount of not less than 1% by mass but not more than 49% by mass based on the total amount of the pressure-sensitive adhesive layer.

20 Claims, No Drawings

(56) References Cited

FOREIGN PATENT DOCUMENTS

| | | |
|---|---|---|
| JP | 2012-77244 A | 4/2012 |
| JP | 2012-102172 | 5/2012 |
| JP | 2012-172006 A | 9/2012 |

OTHER PUBLICATIONS

Notification of Reasons for Refusal in Patent Application No. 2015-549187; dated Nov. 20, 2018 with English Translation.

* cited by examiner

SURFACE-PROTECTING FILM

TECHNICAL FIELD

The present invention relates to a surface protective film. More particularly, the present invention relates to a surface protective film that is temporarily bonded to a surface of a metal plate, a glass plate, a synthetic resin plate or the like to prevent the surface of such an article from being damaged or to prevent dust, etc. from sticking to the surface. In particular, the present invention relates to a surface protective film favorable for protection of a surface of an adherend having a recessed-protruded shape, such as prism sheet or back sheet.

BACKGROUND ART

Surface protective films that are laminated on surfaces of metal plates, glass plates, synthetic resin plates, etc. to prevent surfaces of these articles from being damaged or to prevent dust, etc. from sticking to the surfaces are known.

As a surface protective film of this type, a surface protective film obtained by forming a pressure-sensitive adhesive layer composed of a composition containing a block copolymer and a tackifying resin, together with a polyolefin-based resin substrate through a co-extrusion method or the like is disclosed (see patent literatures 1 to 3).

With regard to this surface protective film, laminating by a co-extrusion method is possible, and a solventless pressure-sensitive adhesive can be attained, so that the film is excellent from the viewpoints of environmental protection and health safety during production. Further, since the production process can be simplified, the film is also economically excellent.

When a surface protective film is stored or conveyed as a wound roll that is obtained by winding the film into a roll, a pressure-sensitive adhesive layer wound on a back surface of a substrate is liable to strongly stick to the substrate.

As a result, feeding of the surface protective film from the wound roll is inhibited, and efficiency of an operation of bonding to the surface of an adherend is lowered. Further, if the surface protective film is forcibly fed, the substrate is partially extended and deformed, or the pressure-sensitive adhesive layer is partially delaminated, so that there is a fear that the film cannot be utilized as a surface protective film.

Thus, it is a problem to make stable adhesive strength of the surface protective film to an adherend and feedability thereof from a wound roll compatible with each other.

In order to solve the above problem, a technique of defining hardness of a pressure-sensitive adhesive to be within a specific range and thereby making stable adhesive strength to an adherend and feedability from a wound roll compatible with each other has been studied (see patent literatures 4 and 5).

CITATION LIST

Patent Literature

Patent literature 1: Japanese Patent Laid-Open Publication No. 1986-103975
Patent literature 2: Japanese Patent No. 2713519
Patent literature 3: Japanese Patent Laid-Open Publication No. 2000-80336
Patent literature 4: Japanese Patent Laid-Open Publication No. 2010-126711
Patent literature 5: Japanese Patent Laid-Open Publication No. 2012-77244

SUMMARY OF INVENTION

Technical Problem

On the other hand, the types of adherends have been diversified, and surface protective films are required to have higher adhesive strength. For enhancing adhesive strength of a pressure-sensitive adhesive layer of a surface protective film, a method of lowering hardness of the pressure-sensitive adhesive layer and thereby increasing a contact area, a method of increasing tack of the pressure-sensitive adhesive layer surface, etc. can be thought.

However, if the adhesive strength of the pressure-sensitive adhesive layer is intended to be enhanced by such methods as above, the adhesive strength to the substrate layer that becomes aback surface of the film increases, and therefore, feedability from the wound roll is deteriorated, so that it is difficult to make further enhancement of the adhesive strength of the pressure-sensitive adhesive layer and good feedability from a wound roll compatible with each other.

Accordingly, it is an object of the present invention to provide a surface protective film that is not only enhanced in adhesive strength but also has easy feedability from a wound roll.

Solution to Problem

In order to solve the aforesaid problem, the present inventors have earnestly studied layer constitution of a pressure-sensitive adhesive layer.

First, the present inventors have studied adoption of an acrylic-based pressure-sensitive adhesive exhibiting higher adhesive strength.

The acrylic-based pressure-sensitive adhesive has a property that it exhibits higher adhesive strength to an adherend by being added to the pressure-sensitive adhesive layer, but on the other hand, it has a property of poor compatibility with polyolefin.

On this account, a surface protective film using the acrylic-based pressure-sensitive adhesive as a material of the pressure-sensitive adhesive layer, good feedability from a wound roll can be achieved.

On the other hand, when the acrylic-based pressure-sensitive adhesive is used alone as a material of the pressure-sensitive adhesive layer or when the acrylic-based pressure-sensitive adhesive is blended in a large amount, sufficient interlaminar strength between the pressure-sensitive adhesive layer and a polyolefin-based substrate layer is not obtained because of low compatibility of the acrylic-based pressure-sensitive adhesive with polyolefin. In this case, delamination of the pressure-sensitive adhesive layer from the substrate layer is thought. If this delamination occurs, adhesive residue on an adherend takes place to cause stain of the adherend attributable to the surface protective film when the surface protective film having been bonded to the adherend is removed.

Then, the present inventors used, as a material to constitute the pressure-sensitive adhesive layer, a styrene-based elastomer, or a styrene-based elastomer and a tackifier, each of which has been used as a pressure-sensitive adhesive layer material in the past, together with the acrylic-based pressure-sensitive adhesive. Further, the present inventors have found that by optimizing the blending ratio between them, adhesive strength of the pressure-sensitive adhesive layer to an adherend and feedability can be made compatible with each other.

The present invention provides such a surface protective film as described below.

That is to say, the surface protective film of the present invention is a surface protective film comprising a polyolefin-based substrate layer and a pressure-sensitive adhesive layer, wherein the pressure-sensitive adhesive layer contains at least a styrene-based elastomer, an acrylic-based pressure-sensitive adhesive and a tackifier, and in the pressure-sensitive adhesive layer, the styrene-based elastomer is blended in an amount of not less than 50% by mass but not more than 90% by mass based on the total amount of the pressure-sensitive adhesive layer, the acrylic-based pressure-sensitive adhesive is blended in an amount of not less than 1% by mass but not more than 40% by mass based on the total amount of the pressure-sensitive adhesive layer, and the tackifier is blended in an amount of not less than 1% by mass but not more than 49% by mass based on the total amount of the pressure-sensitive adhesive layer.

The surface protective film of the present invention is a surface protective film comprising a polyolefin-based substrate layer and a pressure-sensitive adhesive layer, wherein the pressure-sensitive adhesive layer contains at least a styrene-based elastomer, an acrylic-based pressure-sensitive adhesive and a tackifier, and in the pressure-sensitive adhesive layer, the styrene-based elastomer is blended in an amount of not less than 50% by mass but not more than 90% by mass based on the total amount of the pressure-sensitive adhesive layer, the acrylic-based pressure-sensitive adhesive is blended in an amount of not less than 1% by mass but not more than 40% by mass based on the total amount of the pressure-sensitive adhesive layer, and the tackifier is blended in an amount of not more than 49% by mass based on the total amount of the pressure-sensitive adhesive layer.

The surface protective film of the present invention is a surface protective film comprising a polyolefin-based substrate layer and a pressure-sensitive adhesive layer, wherein the pressure-sensitive adhesive layer contains at least a styrene-based elastomer and an acrylic-based pressure-sensitive adhesive and contains a tackifier in some cases, and in the pressure-sensitive adhesive layer, the styrene-based elastomer is blended in an amount of not less than 50% by mass but not more than 90% by mass based on the total amount of the pressure-sensitive adhesive layer, the acrylic-based pressure-sensitive adhesive is blended in an amount of not less than 1% by mass but not more than 40% by mass based on the total amount of the pressure-sensitive adhesive layer, and the tackifier is blended in an amount of not more than 49% by mass based on the total amount of the pressure-sensitive adhesive layer.

In the surface protective film of the present invention, the styrene-based elastomer preferably has a styrene content of not less than 5% by mass but not more than 30% by mass and a diblock copolymer content of not more than 50% by mass.

In the surface protective film of the present invention, the pressure-sensitive adhesive layer preferably has a thickness of not more than 10 μm.

In the surface protective film of the present invention, the pressure-sensitive adhesive layer is preferably laminated by a co-extrusion method.

Advantageous Effects of Invention

According to the present invention, a surface protective film which is not only enhanced in adhesive strength to an adherend having protrusions on its surface but also has easy feedability without excessively firm sticking of the pressure-sensitive adhesive layer to the substrate layer as a wound roll product can be provided.

DESCRIPTION OF EMBODIMENTS

An embodiment of the present invention is described below.

The surface protective film of the present embodiment is a film for protecting a surface of an adherend having a recessed-protruded shape, and has a substrate layer and a pressure-sensitive adhesive layer.

[Constitution of Substrate Layer]

As the substrate layer, a sheet or a film generally used as a backing of a surface protective film can be used without any restriction, and for example, a film formed from a polyolefin-based material or the like can be mentioned as a preferred one.

Examples of the polyolefin-based materials employable for the substrate layer include low-density polyethylene, medium-density polyethylene, high-density polyethylene, linear low-density polyethylene, ethylene/α-olefin copolymer, ethylene/vinyl acetate copolymer, ethylene/ethyl acrylate copolymer, ethylene/methyl methacrylate copolymer, ethylene/n-butyl acrylate copolymer and polypropylene (homopolymer, random copolymer, block copolymer). These polyolefin-based materials may be used singly, or may be used as a mixture or a composition of arbitrary combination. In particular, polypropylene of block copolymer (sometimes abbreviated to "BPP" hereinafter) is preferable as a material of the substrate layer. By the use of BPP, the surface of the substrate layer is roughened, and not only is feedability enhanced but also tear strength and impact strength are enhanced.

To the substrate layer, additives, such as pigment, antiaging agent, stabilizer and ultraviolet absorbing agent, may be added when needed.

The substrate layer is not limited to a single layer and may be formed of plural layers. The total thickness of the substrate layer formed of a single layer or plural layers is, for example, not less than 20 μm but not more than 100 μm, preferably not less than 30 μm but not more than 80 μm.

As the substrate layer of the present embodiment, a film having an external haze of not more than 20% can be used. In general, a small external haze value means that the surface is smooth, and contributes to transparency of not only the substrate layer but also the surface protective film. In a conventional surface protective film, however, it is necessary to increase roughness of the substrate layer surface taking into consideration feedability from a wound roll product, and as a result, transparency of not only the substrate layer but also the surface protective film is sacrificed. In the present embodiment, by adjusting the resins that constitute the pressure-sensitive adhesive layer and the blending ratio between the resins to be within given ranges, as described later, a transparent film having an external haze of not more than 20% can be used as the substrate layer, and excellent feedability can be exhibited even in the case of a wound roll product.

The external haze of the substrate layer can be measured in accordance with, for example, JIS K 7105.

[Constitution of Pressure-sensitive Adhesive Layer]

The pressure-sensitive adhesive layer contains a styrene-based elastomer and an acrylic-based pressure-sensitive adhesive. The pressure-sensitive adhesive layer may further contain a tackifier, when needed.

[Styrene-based Elastomer]

The styrene-based elastomer is, for example, a block copolymer represented by the following general formula (1) or the following general formula (2).

$$A\text{-}B\text{-}A \quad (1)$$

$$A\text{-}B \quad (2)$$

A is preferably a styrene copolymer block, and B is preferably an ethylene-propylene copolymer block, a butadiene copolymer block, an isoprene copolymer block or a polymer block obtained by hydrogenating any of these blocks. In the styrene-based elastomer, an uncoupled styrene block and an uncoupled hydrogenated or non-hydrogenated vinyl-polyisoprene block are also contained.

The styrene content in the styrene-based elastomer is preferably not less than 5% by mass but not more than 30% by mass, more preferably not less than 10% by mass but not more than 25% by mass. If the styrene content is less than 5% by mass, hardness of the pressure-sensitive adhesive layer is lowered, and the adhesive strength becomes too high, so that there is a possibility of occurrence of adhesive residue during removal from an adherend. If the styrene content exceeds 30% by mass, hardness of the pressure-sensitive adhesive layer is increased, and the adhesive strength becomes too low, so that there is a possibility of occurrence of peeling from an adherend.

The styrene content is determined in, for example, the following manner.

A block copolymer composition contained in the pressure-sensitive adhesive layer of the surface protective film is dissolved in a small amount of hexane, thereafter excess acetone is added to separate the solution into an acetone-insoluble matter and an acetone-soluble matter, then the insoluble matter is subjected to NMR (nuclear magnetic resonance spectrum) measurement, and from an integrated intensity ratio of the spectrum, the styrene content is calculated.

The content of the diblock copolymer in the styrene-based elastomer is preferably not more than 50% by mass, more preferably not less than 1% by mass but not more than 30% by mass. If the content of the diblock copolymer exceeds 50% by mass, adhesive force of the pressure-sensitive adhesive layer is high, and the adhesive strength between the pressure-sensitive adhesive layer and the back surface of the substrate layer becomes too high, so that there is a possibility of occurrence of adhesive residue during removal from an adherend. Moreover, since the adhesive strength between the pressure-sensitive adhesive layer and the back surface of the substrate layer becomes high, there is a possibility of lowering of feedability from a wound roll product, and therefore, such a content is undesirable.

The content of the diblock copolymer is determined in, for example, the following manner.

A block copolymer composition contained in the pressure-sensitive adhesive layer of the surface protective film is dissolved in tetrahydrofuran (THF), then Tosoh Corporation GS5000H columns for liquid chromatograph and Tosoh Corporation G4000H columns for liquid chromatograph, in two stages, respectively, namely columns in four stages in total, are connected in series, and using THF as a mobile phase, high-performance liquid chromatography is carried out under the conditions of a temperature of 40° C. and a flow rate of 1 mL/min. From the resulting chart, a peak area corresponding to a coupled component, namely, a diblock copolymer, is determined. A percentage of this peak area to the total peak area is regarded as a content of the diblock copolymer.

The glass transition temperature of the styrene-based elastomer is not lower than −60° but not higher than 20° C. In this range, a more preferred glass transition temperature of the styrene-based elastomer is not lower than −60° C. but not higher than 0° C. If the glass transition temperature is lower than −60° C., adhesive strength in the operating temperature region (e.g., −20° C. to 40° C.) of the surface protective film is hardly exhibited, and there is a possibility of occurrence of peeling from an adherend.

The glass transition temperature is determined in, for example, the following manner.

A block copolymer composition contained in the pressure-sensitive adhesive layer of the surface protective film is dissolved in a small amount of hexane, and thereafter, excess acetone is added to separate the solution into an acetone-insoluble matter and an acetone-soluble matter. The insoluble matter is heated from room temperature at a rate of 20° C./min by means of a differential scanning calorimeter, and a calorific value is measured to prepare an endothermic curve. On the endothermic curve, two prolonged lines are drawn, and from a point of intersection of a ½ straight line between the prolonged lines with the endothermic curve, a glass transition temperature is determined.

The content of a vinyl-polyisoprene block is determined in, for example, the following manner.

Raw material pellets of the pressure-sensitive adhesive layer are dissolved in deuterated chloroform, then NMR (nuclear magnetic resonance spectrum) measurement is carried out, and from an integrated intensity ratio of the spectrum, the content is calculated.

The styrene-based elastomer may or may not have been hydrogenated.

When a tackifier is not contained in the pressure-sensitive adhesive layer, the proportion of the styrene-based elastomer blended in the pressure-sensitive adhesive layer is preferably not less than 60% by mass but not more than 90% by mass based on the total amount of the pressure-sensitive adhesive layer, more preferably not less than 60% by mass but not more than 80% by mass based on the total amount of the pressure-sensitive adhesive layer.

When a tackifier is contained in the pressure-sensitive adhesive layer, the proportion of the styrene-based elastomer blended in the pressure-sensitive adhesive layer is preferably not less than 50% by mass but not more than 90% by mass based on the total amount of the pressure-sensitive adhesive layer, more preferably not less than 50% by mass but not more than 80% by mass based on the total amount of the pressure-sensitive adhesive layer. If the amount of the styrene-based elastomer blended is less than 50% by mass, for example, the amount of the acrylic-based pressure-sensitive adhesive having poor compatibility with polyolefin becomes too large when the pressure-sensitive adhesive layer and a polyolefin-based substrate layer are co-extruded to produce a surface protective film, and therefore, sufficient interlaminar strength between the pressure-sensitive adhesive layer and the polyolefin-based substrate layer is not obtained, so that there is a fear that the pressure-sensitive adhesive layer is liable to be delaminated. On the other hand, if the amount of the styrene-based elastomer blended exceeds 90% by mass, adhesive strength between the pressure-sensitive adhesive layer and the back surface of the substrate layer is increased, and therefore, there is a possibility of lowering of feedability from a wound roll product.

[Acrylic-based Pressure-sensitive Adhesive]

The acrylic-based pressure-sensitive adhesive preferably contains, as a constituent, a polymer of a structure represented by the general formula (3).

$$[C-D-C]n \quad (3)$$

In the general formula (3), C represents a polymer block C, D represents a polymer block D, and n represents an integer of 1 to 3.

The polymer block C in the general formula (3) means a polymer block composed of continuous methacrylic ester units and having mainly a methacrylic ester block, and the polymer block D means a polymer block composed of continuous acrylic ester units and having mainly an acrylic ester block.

When a homopolymer of a methacrylic ester, said homopolymer being obtained by using a methacrylic ester monomer, is taken as a polymer block C, the glass transition temperature of this homopolymer is preferably not lower than 60° C. In the case where the polymer block C is formed using plural methacrylic ester monomers, the glass transition temperatures of homopolymers thereof are each preferably not lower than 60° C. When a homopolymer of an acrylic ester, said homopolymer being obtained by using an acrylic ester monomer, is taken as a polymer block D, the glass transition temperature of this homopolymer is preferably not higher than 10° C. In the case where the polymer block D is formed using plural acrylic ester monomers, the glass transition temperatures of homopolymers thereof are each preferably not higher than 10° C.

By adjusting the glass transition temperature of the homopolymer of a methacrylic ester to not lower than 60° C., the surface protective film follows recessions and protrusions of a sheet and is sufficiently bonded to the sheet even when the film is bonded to a sheet having recessions and protrusions on its surface (recessed-protruded sheet), and besides, when the surface protective film is removed from the recessed-protruded sheet, adhesive residue on the recessed-protruded sheet can be inhibited.

Further, by adjusting the glass transition temperature of the homopolymer of an acrylic ester to not higher than 10° C., the pressure-sensitive adhesive layer containing the acrylic-based pressure-sensitive adhesive follows recessions and protrusions of a sheet and is sufficiently bonded to the sheet even when the surface protective film is bonded to a sheet having recessions and protrusions on its surface (recessed-protruded sheet).

As the methacrylic ester monomer to constitute the polymer block C in the general formula (3), one or more kinds selected from, for example, methyl methacrylate, ethyl methacrylate, n-propyl methacrylate, isopropyl methacrylate, isobutyl methacrylate, sec-butyl methacrylate, t-butyl methacrylate, 2-ethylhexyl methacrylate, isobornyl methacrylate, cyclohexyl methacrylate, 2-cyanoethyl methacrylate and phenyl methacrylate can be mentioned. The glass transition temperatures of homopolymers of these monomers enumerated are each not lower than 60° C.

In the polymer block C, units derived from monomers, e.g., methacrylic esters, such as n-butyl methacrylate, glycidyl methacrylate and allyl methacrylate; olefins, such as methyl acrylate, ethyl acrylate and propyl acrylate; and lactones, such as ε-caprolactone and valerolactone, may be contained in the polymer in small amounts, when needed.

As the acrylic ester monomer to constitute the polymer block D in the general formula (3), one or more kinds selected from, for example, methyl acrylate, ethyl acrylate, n-propyl acrylate, isopropyl acrylate, n-butyl acrylate, isobutyl acrylate, sec-butyl acrylate, n-tetradecyl acrylate, t-butyl acrylate and 2-ethylhexyl acrylate can be mentioned. The glass transition temperatures of homopolymers of these monomers enumerated are each not higher than 10° C.

In the polymer block D, units derived from monomers, e.g., methacrylic esters, such as n-butyl methacrylate, glycidyl methacrylate and allyl methacrylate; olefins, such as methyl acrylate, ethyl acrylate and propyl acrylate; and lactones, such as ε-caprolactone and valerolactone, may be contained in the polymer in small amounts, when needed.

When a tackifier is not contained in the pressure-sensitive adhesive layer, the proportion of the acrylic-based pressure-sensitive adhesive blended in the pressure-sensitive adhesive layer is preferably not less than 10% by mass but not more than 40% by mass based on the total amount of the pressure-sensitive adhesive layer, more preferably not less than 20% by mass but not more than 40% by mass based on the total amount of the pressure-sensitive adhesive layer.

When a tackifier is contained in the pressure-sensitive adhesive layer, the proportion of the acrylic-based pressure-sensitive adhesive blended in the pressure-sensitive adhesive layer is preferably not less than 1% by mass but not more than 40% by mass based on the total amount of the pressure-sensitive adhesive layer, more preferably not less than 5% by mass but not more than 40% by mass based on the total amount of the pressure-sensitive adhesive layer. If the amount of the acrylic-based pressure-sensitive adhesive blended is less than 1% by mass, there is a fear that sufficient adhesive strength cannot be imparted to the pressure-sensitive adhesive layer, and adhesive strength between the pressure-sensitive adhesive layer and the back surface of the substrate layer is increased, so that there is a possibility of lowering of feedability from a wound roll product. On the other hand, if the amount of the acrylic-based pressure-sensitive adhesive blended exceeds 40% by mass, for example, the amount of the acrylic-based pressure-sensitive adhesive having poor compatibility with polyolefin becomes too large when the pressure-sensitive adhesive layer and a polyolefin-based substrate layer are co-extruded to produce a surface protective film, and therefore, sufficient interlaminar strength between the pressure-sensitive adhesive layer and the polyolefin-based substrate layer is not obtained, so that there is a fear that the pressure-sensitive adhesive layer is liable to be delaminated.

The acrylic-based pressure-sensitive adhesive represented by the general formula (3) is preferably one having a mass-average molecular weight, as measured by GPC (gel permeation chromatography), of about 50,000 to 300,000 in terms of polystyrene, and is more preferably one having a mass-average molecular weight of about 60,000 to 200,000 in terms of polystyrene. By adjusting the mass-average molecular weight to be within this range, cohesive force of the pressure-sensitive adhesive layer is not lowered, that is, adhesive residue on an adherend such as a recessed-protruded sheet can be prevented in the removal process, and besides, it becomes possible to obtain good fluidity while properly securing adhesive force.

The ratio between the polymer block C and the polymer block D that constitute the acrylic-based pressure-sensitive adhesive represented by the general formula (3) is preferably 5:95 to 80:20 in terms of mass ratio. By adjusting the ratio to be within this range, cohesive force of the pressure-sensitive adhesive layer is not lowered, that is, adhesive residue on an adherend such as a recessed-protruded sheet can be prevented in the removal process, and besides, adhesive force can be properly secured.

[Tackifier]

As the tackifier blended in the pressure-sensitive adhesive layer, a resin that is selectively compatible with a constituent part B of a block copolymer represented by A-B-A of the aforesaid general formula (1) or A-B of the aforesaid general formula (2) can be preferably adopted. As such resins, resins generally used for pressure-sensitive adhesives, e.g., petroleum resins, such as aliphatic copolymers, aromatic copolymers, aliphatic-aromatic copolymers and alicyclic copolymers, rosin-based resins, such as coumarone-indene resin, terpene resin, terpene phenol resin and polymerized rosin, (alkyl)phenol-based resins, xylene-based resins, and hydrogenation products of these resins can be used without any restriction. These tackifiers may be used singly or in combination of two or more kinds.

To the pressure-sensitive adhesive layer, additives, such as softener, specifically liquid polymer or paraffin oil, filler, pigment, anti-aging agent, stabilizer and ultraviolet absorbing agent, may be added, when needed.

The proportion of the tackifier blended in the pressure-sensitive adhesive layer is preferably not less than 1% by mass but not more than 49% by mass based on the total amount of the pressure-sensitive adhesive layer, more preferably not less than 5% by mass but not more than 40% by mass based on the total amount of the pressure-sensitive adhesive layer. If the amount of the tackifier exceeds 49% by mass, stain of an adherend due to bleeding or lowering of cohesive force is liable to be induced. Moreover, adhesive strength between the pressure-sensitive adhesive layer and a smooth substrate layer (back surface of a wound roll) having a low external haze becomes high, and therefore, there is a possibility of lowering of feedability from a wound roll product.

[Polyolefin]

In the pressure-sensitive adhesive layer, a polyolefin-based resin may be further contained.

Examples of the polyolefins blended in the pressure-sensitive adhesive layer include low-density polyethylene, medium-density polyethylene, high-density polyethylene, linear low-density polyethylene, ethylene/α-olefin copolymer, ethylene/vinyl acetate copolymer, ethylene/ethyl acrylate copolymer, ethylene/methyl methacrylate copolymer, ethylene/n-butyl acrylate copolymer and polypropylene (homopolymer, random copolymer, block copolymer). Of these polyolefins, polypropylene is preferable as a material of the pressure-sensitive adhesive layer. Polypropylene is compatible with a styrene-based elastomer containing a non-hydrogenated or hydrogenated vinyl-polyisoprene block, is excellent in heat resistance and tends not to cause occurrence of stain of an adherend due to bleeding.

The polyolefin blended is not limited to one kind and may be used as a mixture of two or more kinds.

The thickness of the pressure-sensitive adhesive layer is preferably not more than 10 µm. The thickness thereof is more preferably not less than 1 µm but not more than 5 µm. The lower limit of the thickness of the pressure-sensitive adhesive layer is not always restricted, but if the thickness is less than 1 µm, there is a fear that tips of protrusions of an adherend are broken when an adherend has protrusions. Further, the adhesive strength is lowered, and there is also a possibility of occurrence of peeling from an adherend. If the thickness of the pressure-sensitive adhesive layer exceeds 10 µm, adhesive strength is increased, and there is a possibility of occurrence of adhesive residue during removal from an adherend. Moreover, the adhesive strength to the back surface of the substrate layer is increased, and therefore, there is also a possibility of lowering of feedability form a wound roll product.

Hence, a preferred thickness of the pressure-sensitive adhesive layer in the practical use is not less than 1 µm but not more than 5 µm.

Although laminating of the substrate layer and the pressure-sensitive adhesive layer in the surface protective film of the present embodiment is not specifically restricted, they are preferably laminated by a co-extrusion method. According to the co-extrusion method, the substrate layer and the pressure-sensitive adhesive layer can be laminated at a time without using a solvent, and the surface protective film can be formed by a relatively simple production apparatus. Further, by simplifying the production process, the production cost of the surface protective film can be suppressed inexpensively. Furthermore, in the surface protective film formed by the co-extrusion method, interlaminar strength between the surface of the substrate layer and the pressure-sensitive adhesive layer is high, and the possibility of occurrence of adhesive residue during removal from an adherend is lowered. The co-extrusion method may be either a feed block method or a multi-manifold method.

The surface protective film of the present embodiment can be used for the purpose of protecting the surface of an adherend such as metal plate, glass plate or synthetic resin plate, and in particular, the surface protective film can be preferably used for a prism sheet having, on its surface, protrusions each of which has a section of an almost triangular shape having an apex angle of 80° to 100° and a height of 20 µm to 80 µm.

[Effects of Embodiment]

According to the aforesaid embodiment, such effects as described below can be exerted.

According the surface protective film of the present embodiment, the pressure-sensitive adhesive layer is made to have constitution such that at least a styrene-based elastomer, an acrylic-based pressure-sensitive adhesive and a tackifier are contained, the styrene-based elastomer is contained in an amount of not less than 50% by mass but not more than 90% by mass based on the total amount of the pressure-sensitive adhesive layer, the acrylic-based pressure-sensitive adhesive is contained in an amount of not less than 1% by mass but not more than 40% by mass based on the total amount of the pressure-sensitive adhesive layer, and the tackifier is contained in an amount of not less than 1% by mass but not more than 49% by mass based on the total amount of the pressure-sensitive adhesive layer. Further, the pressure-sensitive adhesive layer is made to have constitution such that at least a styrene-based elastomer and an acrylic-based pressure-sensitive adhesive are contained, the styrene-based elastomer is contained in an amount of not less than 60% by mass but not more than 90% by mass based on the total amount of the pressure-sensitive adhesive layer, and the acrylic-based pressure-sensitive adhesive is contained in an amount of not less than 10% by mass but not more than 40% by mass based on the total amount of the pressure-sensitive adhesive layer. Furthermore, the pressure-sensitive adhesive layer is made to have constitution such that at least a styrene-based elastomer and an acrylic-based pressure-sensitive adhesive are contained and a tackifier is contained in some cases, the styrene-based elastomer is contained in an amount of not less than 50% by mass but not more than 90% by mass based on the total amount of the pressure-sensitive adhesive layer, the acrylic-based pressure-sensitive adhesive is contained in an amount of not less than 1% by mass but not more than 40% by mass based on the total amount of the pressure-sensitive adhesive layer, and the tackifier is contained in an amount of not more than 49% by mass based on the total amount of the pressure-sensitive adhesive layer. By virtue of the above constitution, it becomes possible to make a proper adhesive strength and good feedability from a wound roll product compatible with each other. Hence, efficiency of an operation of bonding of the surface protective film to a surface of an adherend can be improved.

Moreover, since the back surface of the substrate layer does not need to be particularly roughened greatly, high transparency of the surface protective film can be achieved.

[Modifications]

The present invention is not limited to the aforesaid embodiment, and alterations, modifications, etc. within a range in which the object of the present invention can be achieved are included in the present invention.

In the present embodiment, a surface protective film having a substrate layer and a pressure-sensitive adhesive layer is given as an example, but the present invention is not limited to this, and for example, the present invention may have constitution such that other functional layers such as an ultraviolet absorbing layer are provided. In this case, an adherend surface can be protected from not only physical contact but also other factors such as ultraviolet rays.

Further, in the substrate layer, a release agent may be blended. By virtue of this, better feedability is obtained without staining the pressure-sensitive adhesive layer when the surface protective film is formed into a wound roll. As the release agent, for example, a resin obtained by graft polymerizing an olefin with siloxane can be mentioned.

In addition, the specific materials, constitution, etc. in carrying out the present invention may be changed to other materials, constitution, etc. within a range in which the object of the present invention can be achieved.

EXAMPLES

Next, the present invention is described in more detail with reference to the following examples and comparative examples. However, it should be construed that the present invention is in no way limited to the contents of those examples.

Example 1

10.0% by mass of a styrene-based elastomer A, 6.0% by mass of a styrene-based elastomer B, 45.0% by mass of a styrene-based elastomer C, 20.0% by mass of an acrylic-based pressure-sensitive adhesive and 19.0% by mass of a tackifier, said components being shown below, were mixed to prepare a pressure-sensitive adhesive layer material.

This pressure-sensitive adhesive layer material and mRPP (available from Japan Polypropylene Corporation, trade name: WINTEC WFW-4) that was a substrate layer material were co-extruded by a feed block method of a two-layer co-extrusion method in such a manner that the thickness of the pressure-sensitive layer became 2 μm and the thickness of substrate layer became 38 μm, whereby a surface protective film was obtained.

The styrene-based elastomers and the pressure-sensitive adhesive used for the pressure-sensitive adhesive layer are shown below.

Styrene-based elastomer A: styrene content 20% by mass, diblock copolymer content 0% by mass, glass transition temperature −15° C. (available from Kuraray Co., Ltd., trade name: HYBRAR 7125)

Styrene-based elastomer B: styrene content 13% by mass, diblock copolymer content 0% by mass, glass transition temperature −32° C. (available from Kuraray Co., Ltd., trade name: HYBRAR 7311)

Styrene-based elastomer C: styrene content 13% by mass, diblock copolymer content 30% by mass, glass transition temperature −50° C. (available from Kraton Performance Polymers, Inc., trade name: G1657)

Acrylic-based pressure-sensitive adhesive (available from Kuraray Co., Ltd, trade name: LA2140e)

Tackifier (available from Arakawa Chemical Industries, Ltd., trade name: ARKON P-140)

Example 2

A surface protective film was obtained in the same manner as in Example 1, except that a mixture of 6.0% by mass of the styrene-based elastomer B, 50.0% by mass of the styrene-based elastomer C, 25.0% by mass of the acrylic-based pressure-sensitive adhesive and 19.0% by mass of the tackifier was used as the pressure-sensitive adhesive layer material.

Example 3

A surface protective film was obtained in the same manner as in Example 1, except that a mixture of 10.0% by mass of the styrene-based elastomer A, 6.0% by mass of the styrene-based elastomer B, 35.0% by mass of the styrene-based elastomer C, 30.0% by mass of the acrylic-based pressure-sensitive adhesive and 19.0% by mass of the tackifier was used as the pressure-sensitive adhesive layer material.

Example 4

A surface protective film was obtained in the same manner as in Example 1, except that a mixture of 80.0% by mass of the styrene-based elastomer C and 20.0% by mass of the acrylic-based pressure-sensitive adhesive was used as the pressure-sensitive adhesive layer material.

Comparative Example 1

A surface protective film was obtained in the same manner as in Example 1, except that a mixture of 69.0% by mass of the styrene-based elastomer A, 6.0% by mass of the styrene-based elastomer B, 11.5% by mass of the styrene-based elastomer C and 13.5% by mass of the tackifier was used as the pressure-sensitive adhesive layer material.

Comparative Example 2

A surface protective film was obtained in the same manner as in Example 1, except that a mixture of 21.7% by mass of the styrene-based elastomer A, 9.4% by mass of the styrene-based elastomer B, 50.2% by mass of the styrene-based elastomer C and 18.7% by mass of the tackifier was used as the pressure-sensitive adhesive layer material.

Comparative Example 3

A surface protective film was obtained in the same manner as in Example 1, except that a mixture of 20.0% by mass of the styrene-based elastomer C and 80.0% by mass of the acrylic-based pressure-sensitive adhesive was used as the pressure-sensitive adhesive layer material.

Comparative Example 4

A surface protective film was obtained in the same manner as in Example 1, except that a mixture of 69.0% by mass of the styrene-based elastomer A, 6.0% by mass of the styrene-based elastomer B, 16.0% by mass of the styrene-based elastomer C and 9.0% by mass of the tackifier was used as the pressure-sensitive adhesive layer material.

[Evaluation Methods]

With regard to each film of the above examples and comparative examples, various properties were evaluated by the following methods. The results are set forth in Table 1.

(1) Adhesive Strength

The film was pressure-bonded to a polycarbonate resin mat sheet having, as surface roughness, Ra of 0.40 μm, Ry of 2.3 μm and Rz of 1.6 μm (surface roughness evaluation equipment: HANDYSURF E-35B manufactured by Tokyo Seimitsu Co., Ltd.) under the conditions of a linear pressure of 0.2 MPa and 2 m/min, and they were stored at 23° C. for 24 hours. Thereafter, using a tensile tester, they were peeled off from each other at a pulling rate of 0.3 m/min and a peel angle of 180° to measure a resistance value (N/25 mm).

(2) Feeding Strength

The adhesive surface of the film and the back surface of the substrate layer were pressure-bonded to each other under the conditions of a linear pressure of 0.38 MPa and 2 m/min, and the film was stored at 23° C. for 5 minutes. Thereafter, using a tensile tester, the adhesive surface and the back surface of the substrate layer were peeled off from each other at a pulling rate of 0.3 m/min and a peel angle of 90° to measure a resistance value (N/25 mm).

(3) Haze

Total haze of the film was measured in accordance with JIS K 7105 using a haze meter (HZ-1 manufactured by Suga Test Instruments Co., Ltd.).

(4) Tape Removal Test

A fabric tape (No. 600 available from Sekisui Chemical Co., Ltd.) was laminated to the adhesive surface, and thereafter, when the fabric tape was removed from the adhesive surface, whether the pressure-sensitive adhesive layer was delaminated from the substrate layer or not was confirmed. A case where the pressure-sensitive adhesive layer was not delaminated from the substrate layer was evaluated "A", and a case where the pressure-sensitive adhesive layer was delaminated from the substrate layer was evaluated "B".

[Evaluation Results]

From the results shown in Table 1, it can be seen that in the films of the examples, sufficient adhesive strength to the recessed-protruded surface and good feedability can be made compatible with each other.

By comparison between Example 1 and Comparative Example 1 and between Example 3 and Comparative Example 2, it can be seen that the adhesive strength to the recessed-protruded surface can be effectively increased without impairing feedability.

Further, by comparison between Example 4 and Comparative Example 3, it can be seen that optimum adhesive strength can be obtained without occurrence of delamination.

INDUSTRIAL APPLICABILITY

The present invention can be utilized as a surface protective film that is favorable for particularly protecting the surface of an adherend having a recessed-protruded shape on its surface, such as prism sheet or mat sheet.

The invention claimed is:

1. A surface protective film, comprising:
a polyolefin-based substrate layer and
a pressure-sensitive adhesive layer,
wherein:
the pressure-sensitive adhesive layer comprises:
   a styrene-based elastomer,
   an acrylic-based pressure-sensitive adhesive, and
   a tackifier, and
in the pressure-sensitive adhesive layer,
the styrene-based elastomer is blended in an amount of not less than 50% by mass but not more than 90% by mass based on the total amount of the pressure-sensitive adhesive layer,
the acrylic-based pressure-sensitive adhesive is blended in an amount of not less than 1% by mass but not more than 40% by mass based on the total amount of the pressure-sensitive adhesive layer, and
the tackifier is blended in an amount of not less than 1% by mass but not more than 49% by mass based on the total amount of the pressure-sensitive adhesive layer,

TABLE 1

| | | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|
| Pressure-sensitive adhesive layer constitution | Formulation (mass %) | Styrene-based elastomer A | 10.0 | — | 10.0 | — | 69.0 | 21.7 | — | 69.0 |
| | | Styrene-based elastomer B | 6.0 | 6.0 | 6.0 | — | 6.0 | 9.4 | — | 6.0 |
| | | Styrene-based elastomer C | 45.0 | 50.0 | 35.0 | 80.0 | 11.5 | 50.2 | 20.0 | 16.0 |
| | | Acrylic-based pressure-sensitive adhesive | 20.0 | 25.0 | 30.0 | 20.0 | — | — | 80.0 | — |
| | | Tackifier | 19.0 | 19.0 | 19.0 | — | 13.5 | 18.7 | — | 9.0 |
| | | Total | 100 | 100 | 100 | 100 | 100 | 100 | 100 | 100 |
| Pressure-sensitive adhesive layer thickness (μm) | | | 2 | 2 | 2 | 2 | 2 | 2 | 2 | 2 |
| Adhesive strength (N/25 mm) | | | 0.57 | 0.87 | 2.12 | 0.41 | 0.35 | 0.52 | — | 0.35 |
| Feeding strength (N/25 mm) | | | 0.22 | 0.23 | 0.32 | 0.1 | 0.21 | 0.34 | — | 0.29 |
| Haze (total haze) (%) | | | 8 | 8 | 8 | 8 | 8 | 8 | 8 | 8 |
| Tape removal test | | | A | A | A | A | A | A | B | A | the acrylic-based pressure-sensitive adhesive comprises, as a constituent, a polymer of a structure represented by formula (3),

[C-D-C]n    (3), wherein C represents a polymer block C,
D represents a polymer block D, and
n represents an integer of 1 to 3,
the polymer block C is a polymer block composed of continuous methacrylic ester units, and
the polymer block D is a polymer block composed of continuous acrylic ester units.

2. A surface protective film, comprising:
a polyolefin-based substrate layer and
a pressure-sensitive adhesive layer,
wherein:
the pressure-sensitive adhesive layer comprises
   a styrene-based elastomer and
   an acrylic-based pressure-sensitive adhesive, and
in the pressure-sensitive adhesive layer,
the styrene-based elastomer is blended in an amount of not less than 60% by mass but not more than 90% by mass based on the total amount of the pressure-sensitive adhesive layer, and
the acrylic-based pressure-sensitive adhesive is blended in an amount of not less than 10% by mass but not more than 40% by mass based on the total amount of the pressure-sensitive adhesive layer,
the acrylic-based pressure-sensitive adhesive comprises, as a constituent, a polymer of a structure represented by formula (3),

[C-D-C]n    (3), wherein C represents a polymer block C,
D represents a polymer block D, and
n represents an integer of 1 to 3,
the polymer block C is a polymer block composed of continuous methacrylic ester units, and
the polymer block D is a polymer block composed of continuous acrylic ester units.

3. A surface protective film, comprising:
a polyolefin-based substrate layer, and
a pressure-sensitive adhesive layer,
wherein:
the pressure-sensitive adhesive layer, comprising:
   a styrene-based elastomer and
   an acrylic-based pressure-sensitive adhesive, and
   optionally a tackifier, and
in the pressure-sensitive adhesive layer,
the styrene-based elastomer is blended in an amount of not less than 50% by mass but not more than 90% by mass based on the total amount of the pressure-sensitive adhesive layer,
the acrylic-based pressure-sensitive adhesive is blended in an amount of not less than 1% by mass but not more than 40% by mass based on the total amount of the pressure-sensitive adhesive layer, and
the tackifier, if present, is blended in an amount of not more than 49% by mass based on the total amount of the pressure-sensitive adhesive layer,
the acrylic-based pressure-sensitive adhesive comprises, as a constituent, a polymer of a structure represented by formula (3),

[C-D-C]n    (3), wherein C represents a polymer block C,
D represents a polymer block D, and
n represents an integer of 1 to 3,
the polymer block C is a polymer block composed of continuous methacrylic ester units, and
the polymer block D is a polymer block composed of continuous acrylic ester units.

4. The surface protective film of claim 1,
wherein the styrene-based elastomer has
a styrene content of not less than 5% by mass but not more than 30% by mass, and
a diblock copolymer content of not more than 50% by mass,
based on the total amount of the styrene-based elastomer.

5. The surface protective film of claim 1,
wherein the pressure-sensitive adhesive layer has a thickness of not more than 10 μm.

6. The surface protective film of claim 1,
wherein the pressure-sensitive adhesive layer is laminated by a co-extrusion method.

7. The surface protective film of claim 4,
wherein the pressure-sensitive adhesive layer has a thickness of not more than 10 μm.

8. The surface protective film of claim 4,
wherein the pressure-sensitive adhesive layer is laminated by a co-extrusion method.

9. The surface protective film of claim 5,
wherein the pressure-sensitive adhesive layer is laminated by a co-extrusion method.

10. The surface protective film of claim 2,
wherein the styrene-based elastomer has
a styrene content of not less than 5% by mass but not more than 30% by mass, and
a diblock copolymer content of not more than 50% by mass,
based on the total amount of the styrene-based elastomer.

11. The surface protective film of claim 2,
wherein the pressure-sensitive adhesive layer has a thickness of not more than 10 μm.

12. The surface protective film of claim 2,
wherein the pressure-sensitive adhesive layer is laminated by a co-extrusion method.

13. The surface protective film of claim 10,
wherein the pressure-sensitive adhesive layer has a thickness of not more than 10 μm.

14. The surface protective film of claim 10,
wherein the pressure-sensitive adhesive layer is laminated by a co-extrusion method.

15. The surface protective film of claim 11,
wherein the pressure-sensitive adhesive layer is laminated by a co-extrusion method.

16. The surface protective film of claim 3,
wherein the styrene-based elastomer has
a styrene content of not less than 5% by mass but not more than 30% by mass, and
a diblock copolymer content of not more than 50% by mass,
based on the total amount of the styrene-based elastomer.

17. The surface protective film of claim 3,
wherein the pressure-sensitive adhesive layer has a thickness of not more than 10 μm.

18. The surface protective film of claim 3,
wherein the pressure-sensitive adhesive layer is laminated by a co-extrusion method.

19. The surface protective film of claim 16,
wherein the pressure-sensitive adhesive layer has a thickness of not more than 10 μm.

20. The surface protective film of claim 16, wherein the pressure-sensitive adhesive layer is laminated by a co-extrusion method.

\* \* \* \* \*